Andrew Christian.
Improvement in Velocipedes.
108967     Fig. 1     PATENTED Nov 8 1870
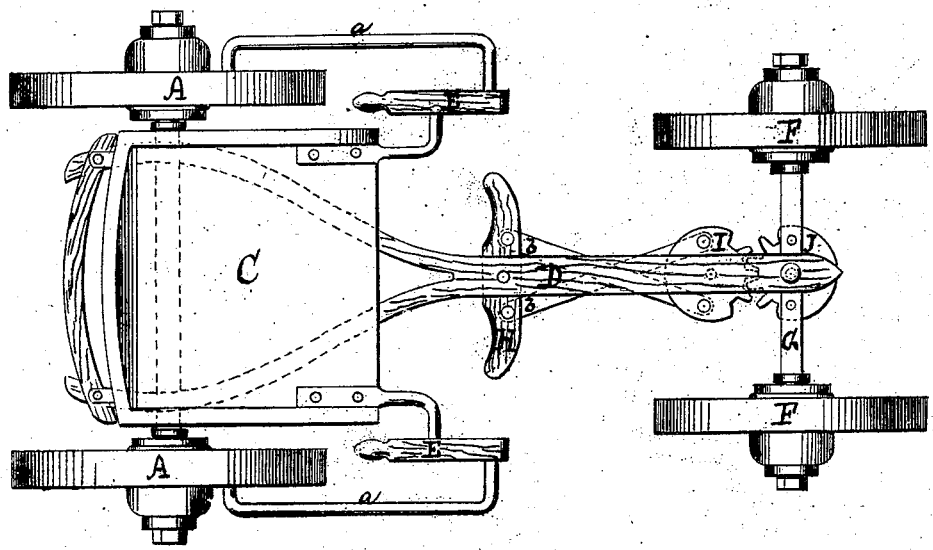
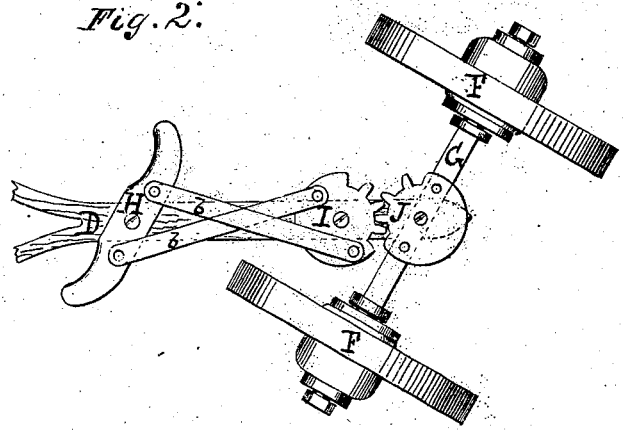
Fig. 2.
Witnesses:
Inventor:

United States Patent Office.

ANDREW CHRISTIAN, OF NEW YORK, N. Y.

Letters Patent No. 108,867, dated November 8, 1870.

IMPROVEMENT IN STEERING MECHANISMS FOR VELOCIPEDES.

The Schedule referred to in these Letters Patent and making part of the same.

*To all whom it may concern:*

Be it known that I, ANDREW CHRISTIAN, of the city, county, and State of New York, have invented a new and useful Improvement in Velocipedes; and I hereby declare that the following is a full, clear, and exact description thereof, reference being had to the accompanying drawing, which forms part of this specification.

My invention relates to an improvement in the steering mechanism of childrens' velocipedes, particularly the class which is steered by the feet of the rider placed upon a double lever connected by rods to the front axle; and It consists in the combination with the front axle, reach, foot-lever, and its connecting-rods in a velocipede, of two racks or toothed segments or wheels, connected respectively to the said front axle and reach, the teeth of the one arranged to engage with the teeth of the other, whereby the turning of the front axle, at any desired angle to the reach, in order to cause the velocipede to progress in the desired direction, is quickly and easily effected.

In the accompanying drawing—

Figure 1 is a plan or top view of a child's velocipede, showing my improvement applied thereto.

Figure 2 is an inverted plan view of the forward part of the velocipede, showing the front wheels in a position to turn a curve.

A A designate the rear wheels of the velocipede, which wheels are mounted upon an axle in the usual manner.

C designates a seat for the rider, suitably supported upon the reach D.

Hand-levers E E, connected by rods $a$ $a$ to spokes of the rear wheels, constitute the propelling mechanism.

F F are the front wheels, mounted on a front axle, G, which latter is suitably pivoted to the said reach D.

A foot-lever, H, is pivoted to the reach D, and it carries on each side of its fulcrum-pin a connecting-rod, $b$, and these connecting-rods cross each other, and are pivoted to opposite sides of a toothed plate, I, pivoted to the reach D, which engages with another toothed plate, J, secured to the front axle G.

I have shown in the drawing the toothed plates as circular in form, but it is obvious that equivalent mechanism, such as segments or racks, can be employed, a sufficient number of teeth being provided for effecting the turning of the forward axle at the required angle to the reach to insure the turning of as sharp a curve as the construction of the velocipedes, in other respects, will permit.

It is obvious that the rods $b$ $b$ need not necessarily be constructed as shown, as they may be parallel with each other, or the points of connection at the one terminus be further apart than at the other, if desired, and substantially the same result, in connection with the racks, will be produced.

In operating this steering mechanism, it is obvious that a forward thrust of either one or the other of the feet upon the lever H will turn the front axle so as to direct the velocipede in any given direction.

By the use of these racks the rider is enabled to turn the front axle, and hence the front wheels move more precisely, readily, and easily, than when the connecting-rods take direct hold of or be pivoted directly to the front axle, as at present practiced.

I am aware that toothed wheels, racks, and segments are well-known mechanical devices, and are constantly met with in mechanical contrivances for changing the position of certain parts thereof, relatively with other parts; but I know of no instance, prior to my invention, where such devices have been applied to and combined with a child's velocipede for effecting the turning of the steering-wheels thereof by the feet of the rider; and I do not claim any such device irrespective of its combination in a child's velocipede, so as to be operated by force emanating from the feet of the rider, as and for the purposes as hereinabove set forth.

What I claim as my invention, and desire to secure by Letters Patent, is—

In a velocipede, the combination of the racks I J with the front axle G, reach D, foot-lever H, and connecting-rods $b$ $b$, substantially as and for the purpose herein specified.

A. CHRISTIAN

Witnesses:
  M. M. LIVINGSTON,
  T. B. BEECHER.